Sept. 26, 1950        B. P. LAWSON        2,523,380
SLIDER NECKING MACHINE

Filed May 29, 1946        14 Sheets-Sheet 1

INVENTOR.
BIRDSALL P. LAWSON
BY

Sept. 26, 1950 B. P. LAWSON 2,523,380
SLIDER NECKING MACHINE
Filed May 29, 1946 14 Sheets-Sheet 4

INVENTOR.
BIRDSALL P. LAWSON
BY
ATTORNEY

Sept. 26, 1950    B. P. LAWSON    2,523,380
SLIDER NECKING MACHINE
Filed May 29, 1946    14 Sheets-Sheet 12

INVENTOR.
BIRDSALL P. LAWSON.
BY

Patented Sept. 26, 1950

2,523,380

UNITED STATES PATENT OFFICE 2,523,380

SLIDER NECKING MACHINE

Birdsall P. Lawson, Providence, R. I., assignor to Pilling Chain Company, Providence, R. I., a corporation of Rhode Island Application May 29, 1946, Serial No. 673,068

4 Claims. (Cl. 153—48)

This invention relates broadly to the manufacture of sliders for slide fasteners, and is more particularly directed to means for reinforcing or stiffening the web portion or neck of the sliders to render these latter more resistant to the stresses to which they are subjected in use.

As is well known to those skilled in the art, the sliders which are usually produced from strip metal or the like, embody two wings interconnected by a web portion commonly termed the neck, the wings being provided with side flanges defining the channels required for the engagement of the slider with the interlocking elements or scoops of the fastener. As the slider is subject, when the fastener is in use, to severe stresses which tend to spread apart the wings or to displace the same toward one another, the slider must possess considerable rigidity to remain serviceable for a sufficient length of time. It has therefore become common practice to provide stiffening means in the slider, and the most effective stiffening means has generally been found to consist in the provision of a substantially V-shaped formation, or the like in the neck of the slider, which besides stiffening the slider also results in the provision of diverging surfaces internally of the slider cooperating with diverging portions of the flanges of the wings to guide the fastener scoops in the movement of the slider to open or close the fastener.

The general object of the present invention is to provide a novel mechanism for defining a substantially V-shaped reinforcement, or the like, in the neck of sliders in a simple die operation effectuable on sliders of conventional construction as the final steps of production of otherwise already completely shaped sliders.

Another object is to provide a machine for performing the aforementioned neck reinforcing operation, or so-called necking operation, which is adapted to function at considerable speed to meet the requirement of modern production methods, and which is reliable in operation for prolonged periods of use.

Still another object is to provide a machine of the character described which consists of a plurality of distinct cooperating units that can be readily assembled into a complete functioning machine, and readily disassembled whenever desired for permitting easy substitution of parts or for other reasons.

A further object is to provide a machine for necking sliders in which the time of shaping of the neck of the slider in relation to the time required for the complete necking cycle is greater than in other machines, whereby to facilitate the flow of metal, better to control the shaping of the neck, and to permit to increase the speed of operation of the machine.

A still further object is to provide novel means incorporated in an intermediate necking unit of the machine and functioning in predetermined time relation to the rotary slider propelling means, which are adapted to engage and hold the sliders during the necking operation and cooperate positively to control the amount of deformation of the neck of the sliders defining the desired reinforcement therein.

These and other related objects will become apparent in the following description of the invention illustrated in the appended drawings by way of example, wherein:

Fig. 8 is a front elevational view of the intermediate or necking unit of the machine illustrating the reciprocatory means cooperating to engage the sliders at the end of their progression through the feeding unit and to deform the neck of the sliders to provide therein the desired V-shaped reinforcement or the like.

Figures 1, 2, 3:
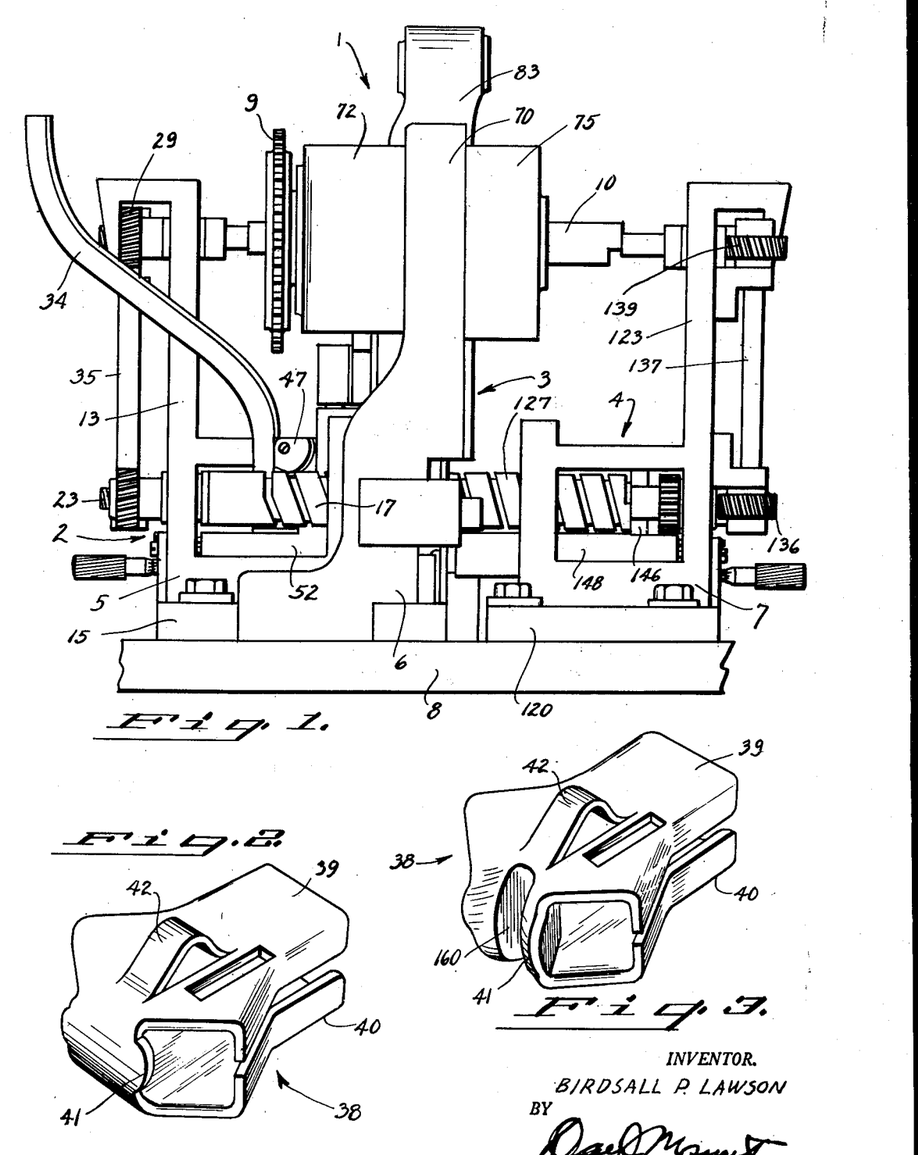
Fig. 1 is an elevational view of an assembled machine according to the invention.
Fig. 2 is a perspective view of a slider prior to the necking operation performed by the machine.
Fig. 3 is a similar perspective view showing the slider after the necking operation has been effected.

Referring now in detail to the drawings, a machine according to the invention, indicated as a whole at 1 in Fig. 1, consists of three units designed for easy assembly and disassembly, namely an entrance or feeding unit generally indicated at 2, an intermediate or necking unit 3 which receives the sliders from the unit 2 and comprises the means for providing the V-shaped reinforcement or the like in the neck of the sliders fed thereto, and an exit unit 4 by means of which the sliders are automatically discharged upon completion of the necking operation. The three units comprise respectively, frames 5, 6 and 7 which are suitably secured, to assemble the machine, on a common base 8. The units are simultaneously actuated from a sprocket wheel 9 driven from a suitable electric motor (not shown) and mounted on a crankshaft 10 carried by the necking unit 3 in the manner hereafter described.

The slider feeding unit 2 is illustrated in detail in Figs. 4 to 7 inclusive. The frame 5 of the unit comprises a casting defining a pair of spaced members or uprights 12 and 13, the latter embodying an upper bracket portion 14, and suitably fixed to a base plate 15, which in turn is removably secured to the base 8 of the machine as by means of bolts 16.

Figure 4:
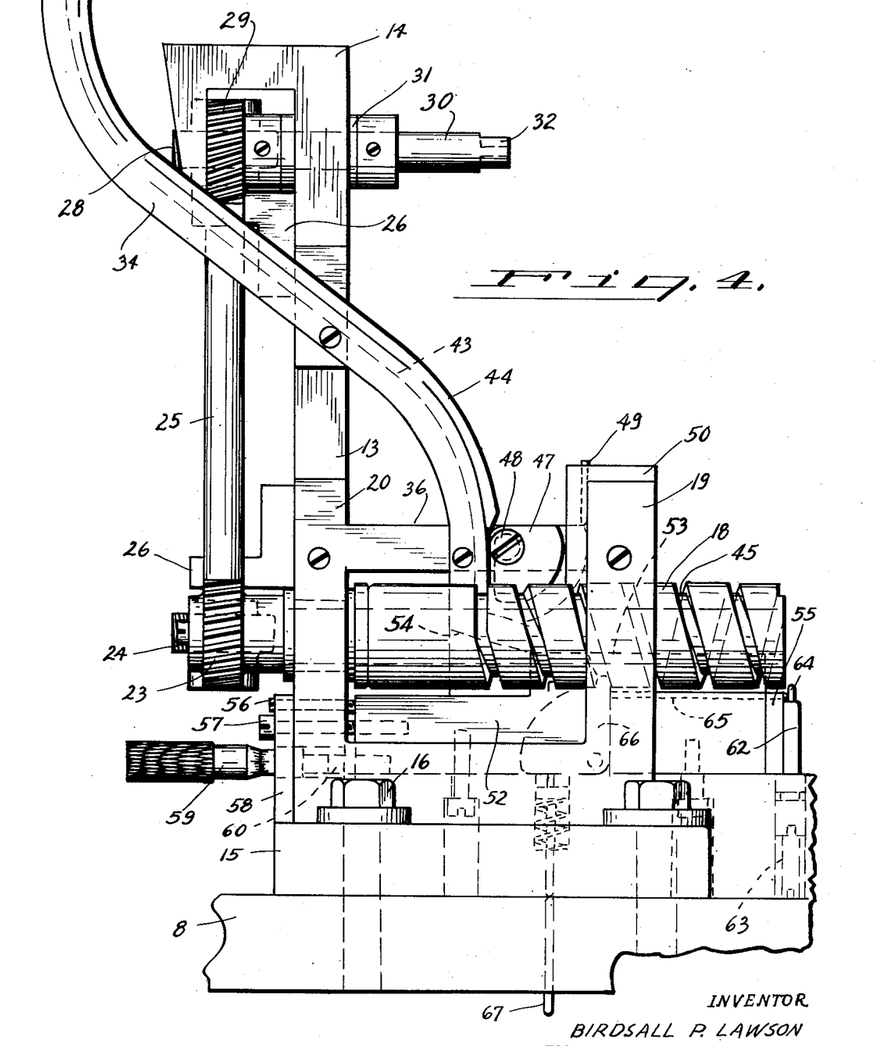
Fig. 4 is a side elevational view of the entrance or feeding unit forming part of the complete machine.

A pair of horizontal parallel grooved members or worms 17, 18 are rotatably mounted, respectively, in said uprights 12, 13 and in members 19, 20 secured to the uprights by means of screws 21. The worms carry at their outer end (left end as seen in Fig. 4) intermeshing gears 22, 23, the former meshing in turn with a gear 24 at one end of a shaft 25 mounted in bearings 26, suitably secured to the upright 13. The upper end of the shaft 25 has a gear 28 which meshes with a gear 29 fixed to a shaft 30 suitably mounted in the bracket portion 14 as at 31, the inner or right end 32 of the shaft 30 being conformed for interengagement with the adjacent end of the crankshaft 10 in a predetermined relative position. As will be apparent, the worms 17, 18 will therefore be rotated in opposite direction during operation of the machine, in predetermined time relation to the actuation of the crankshaft.

A chute 34 secured to the upright 13 and to a horizontal element 36 of the casting comprising the uprights 12, 13 is provided for feeding preformed sliders to be subjected to the necking operation to the worms 17, 18, the sliders being of the type illustrated in Fig. 2 comprising the usual wings 39, 40 interconnected by a web portion or neck 41 and the bail attaching lug 42, which in this type is located on the longitudinal axis of the slider. The chute body is grooved as at 43 to define, together with spaced strips 44 suitably secured thereto, a channel adapted to receive the sliders with their lugs 42 disposed outwardly and to direct the sliders to and between the worms 17, 18 in a vertical position with the neck portion uppermost. The groove 43 at the end of the chute is alined with the initial straight portions of the grooves 45 of the worms along which the slider may fall by gravity during rotation of the worms onto a track to be described, the sliders being then propelled by the worm grooves in the rotation of the worms to the necking unit 3 which receives the sliders and performs the necking operation as hereinafter described.

To prevent jamming and damage to the machine in case a slider should fail to move downwardly by the amount required for proper action by the worms, because of a burr or other reasons, there is associated with the lower end of the chute a sector 47 pivoted at 48 to the aforesaid fixed element 36 and engaging a pin 49, which is vertically slidable in a block 50 clamped between the members 12 and 19 and is in turn associated with a microswitch (not shown) operable through suitable electric means to stop the motor that drives the machine. Normally the sliders clear to sector 47 and are therefore free to advance along the worms, but should a slider fail to move downwardly by the amount required, it will engage the sector and actuate the microswitch and stop the machine during the continued rotation of the worms.

Mounted on the base plate 15 there is a slide 52 (Fig. 4) extending underneath the worms 17, 18 to a point near the right or inner end thereof and having a tapering portion 53 projecting upwardly between the worms. A block 54 having an inclined upper edge is secured to the slide between the worms underneath the chute 34 and forms an extension of the tapering portion 53, said upper edge of the block defining with the upper edge of the portion 53 the track on which the sliders fed to the worms travel during their advancement along the worms and functioning also to prevent that more than one slider at a time may be engaged by the propelling portions of the worm grooves. Secured to the inner or right end of the slide and forming an extension thereof, there is a die plate 55 conforming to the contour of said end, which has its face flush with the inner end of the worms. The slide is longitudinally adjustable to insure maintenance of the die plate in the position aforementioned, by means of push-pull screws 56, 57 mounted in a block 58 integral with the base plate 15 at the outer end of this latter, the screws being supplemented for micrometric adjustment by a micrometer head 59 also mounted in block 58 and acting against a stud 60 secured to the slider.

The die plate 55 is preferably vertically grooved as at 61, to accommodate the adjacent edge of the working end of the necking punch later described, to permit the use of punch ends extending across the neck of the slider and projecting therefrom, as is desirable for an even deforming action of the punch.

Figures 5, 6:
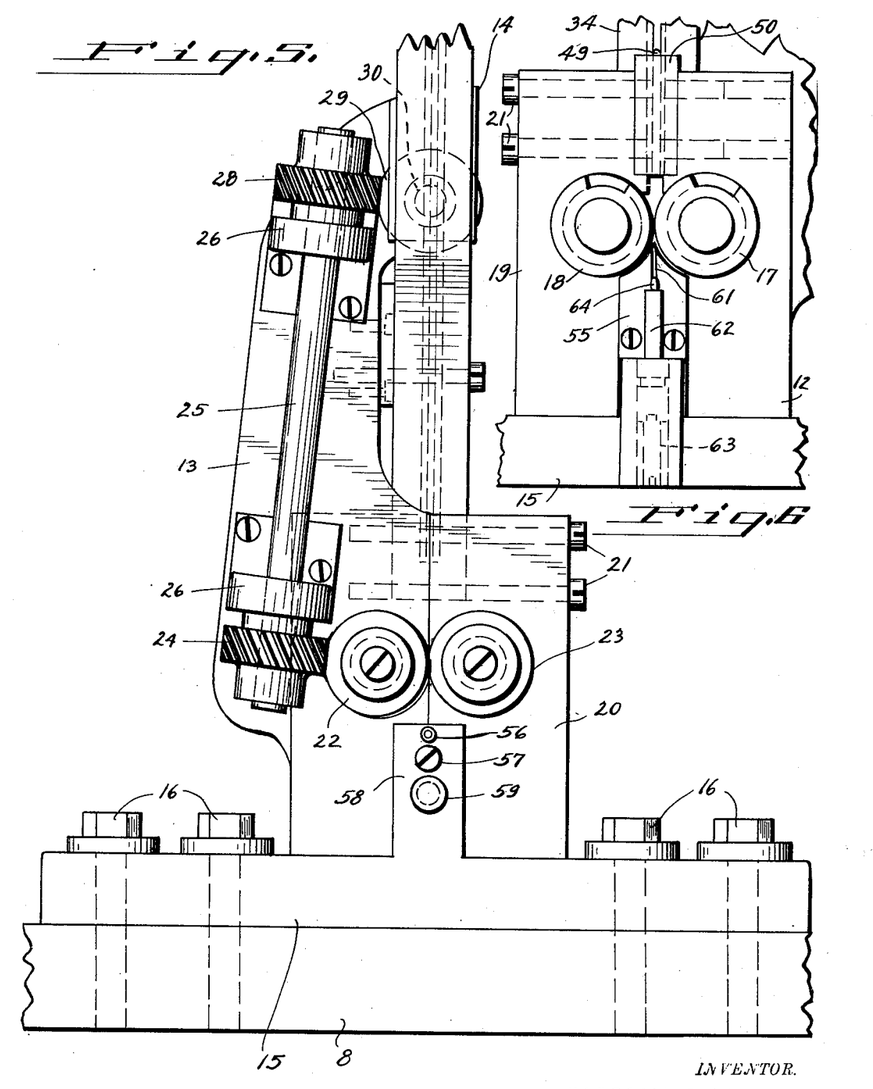
Fig. 5 is an end elevational view of the unit of Fig. 4.
Fig. 6 is a fragmentary elevational view of the opposite end of the unit of Fig. 4.
Figure 7:
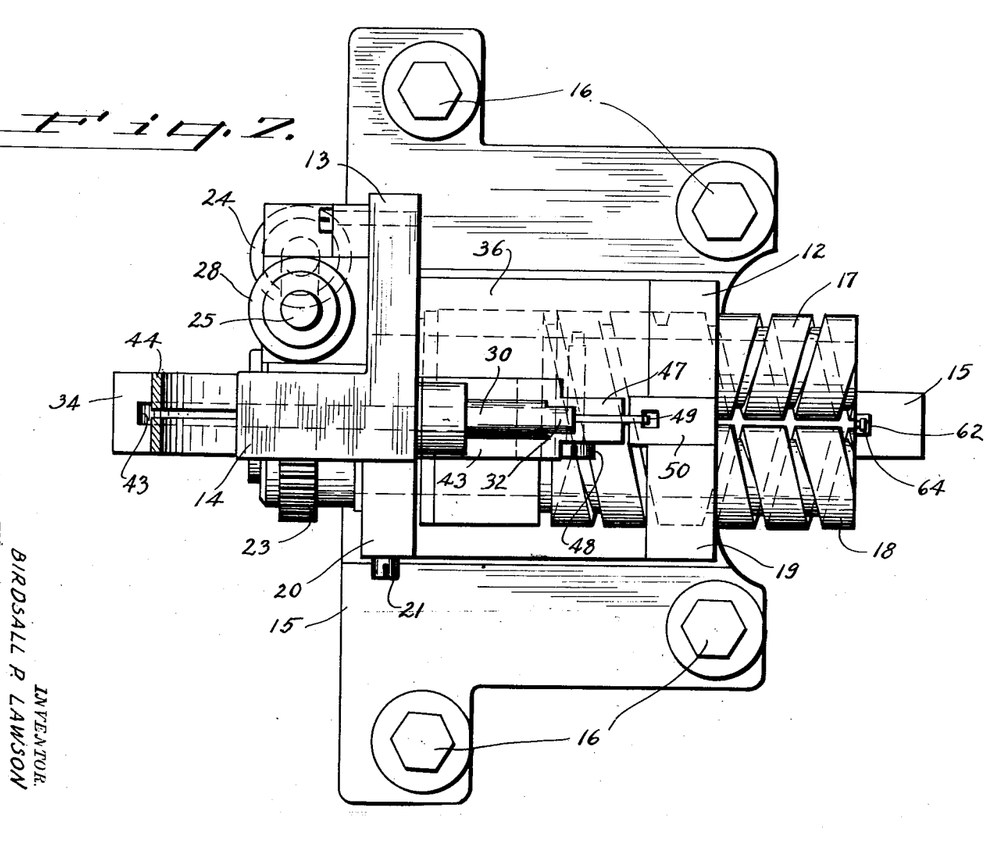
Fig. 7 is a top plan view of said entrance or feeding unit of the machine.
Figure 10:
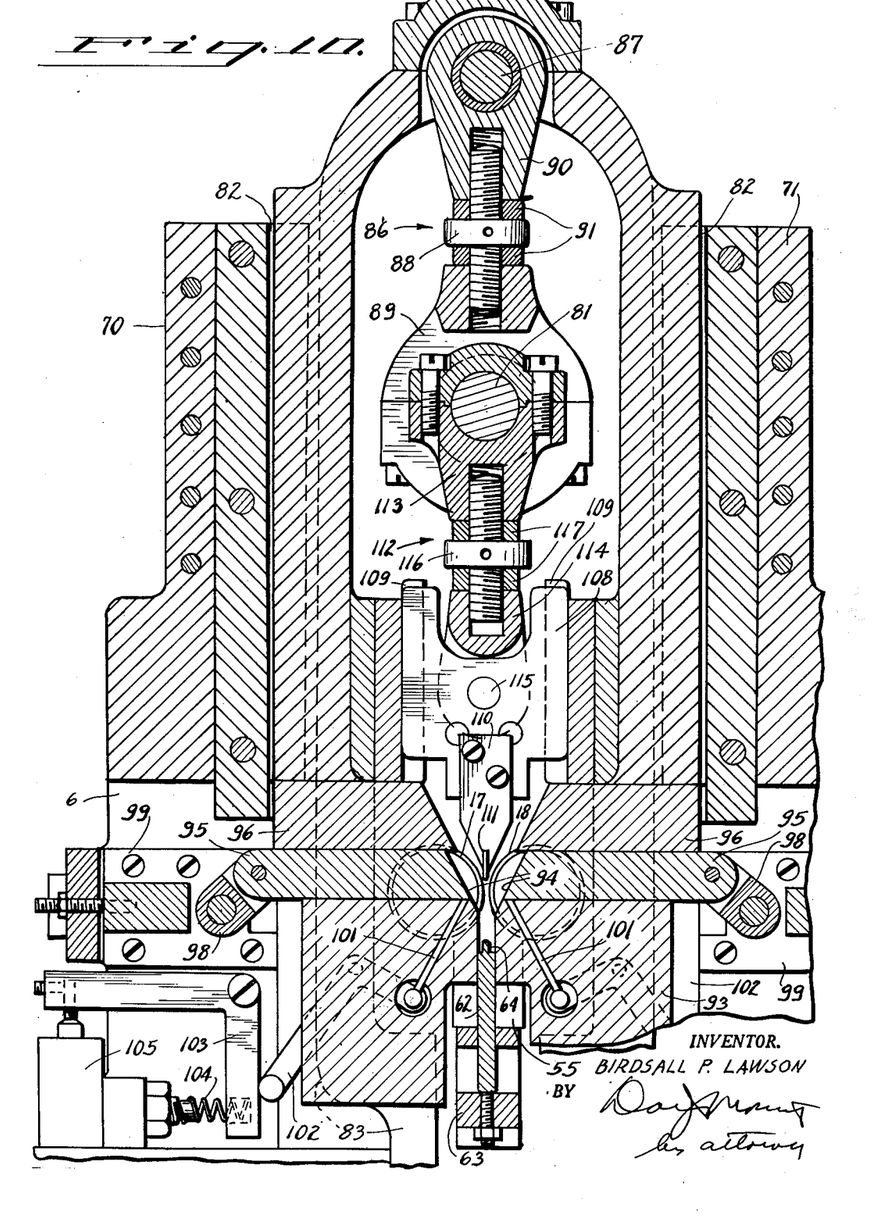
Fig. 10 is a vertical section through the necking unit, on line 10—10 of Fig. 9, showing the reciprocatory means of the unit in their uppermost positions reached in the cycle of operation.
Figure 18:
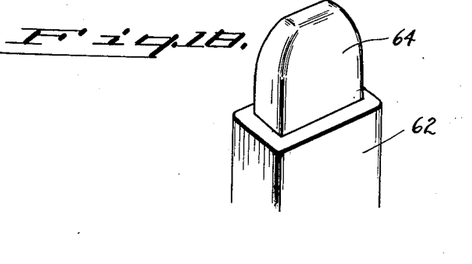
Fig. 18 is a similar perspective view of a stationary arbor cooperating with the punch and the slider engaging fingers in the necking operation.
Figure 19A:
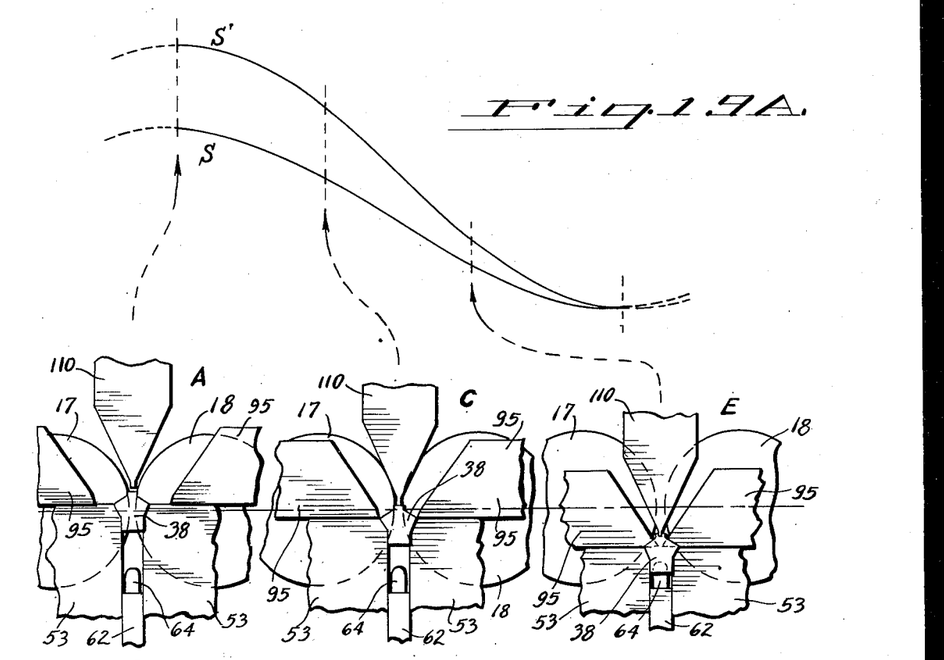
Figs. 19A and 19B are a diagram of the relative vertical positions of the necking punch and of the slider engaging means during the necking cycle.
Figure 19B:
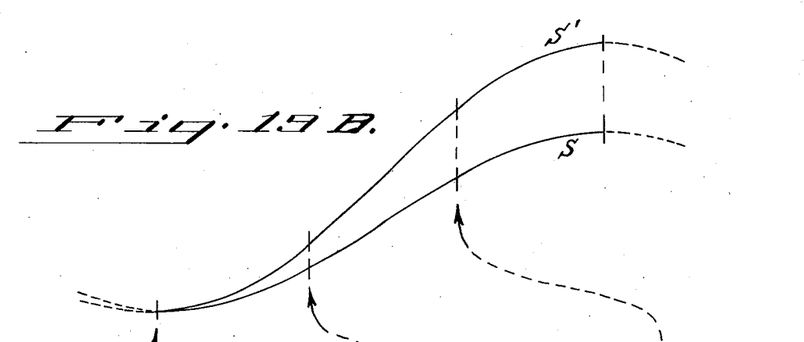

An element or arbor 62 is mounted on the base plate 15 for vertical adjustment as shown at 63 (Figs. 4, 7, 10). The arbor, the function whereof will become later apparent, extends vertically centrally of the die plate 55 against which it abuts, with its working point 64 (best illustrated in Fig. 18), vertically spaced from the upper edge of the die plate 55, as shown in Fig. 6. The body of the arbor has a thickness substantially corresponding to that of the sliders, and the working point 64 is shaped to enter the sliders between their wings to hold the sliders during the necking operation later described.

To insure stopping of the machine should the working point 64 become broken or bent in operation, there is provided a horizontal pin 65 longitudinally slidable in the slide 52, which is urged into contact with the point 64 by a sector 66 pivotally mounted in the slide and engaged by a spring biased plunger 67 controlling through suitable means a microswitch (not shown) operable to stop the machine driving motor. Upon breaking or bending of the arbor point 64, the pin 65 will be allowed to advance, and through the rotation of the sector 66 in a clockwise direction and the following rising of the plunger 67 the micro-switch will be actuated to stop the machine.

The intermediate or necking unit 3 will now be described, reference being had particularly to Figs. 8 to 11 inclusive.

The aforementioned frame 6 of the unit consists of a casting secured to the base 8 which comprises a pair of uprights 70, 71 interconnected by an upper transverse member 72. Journalled in ball bearings 73 suitably mounted in the member 72 and in a front plate 75 secured to the uprights, as at 74 (see particularly Figs. 9, 11) there is the aforementioned crankshaft 10 having one end 77 suitably formed for driving engagement with the end 32 of the shaft 30 of the feeding unit 2 and carrying adjacent said end the aforementioned sprocket wheel 9 driven from the machine actuating motor. The opposite end 78 of the crankshaft is formed similarly to the end 77 for driving engagement with the shaft of the discharge unit hereafter described. The shaft 10 is provided with spaced crank portions 79, 80 and an intermediate crank portion 81, which is eccentric relative to the portions 79, 80, as illustrated in Fig. 11, for a purpose later apparent.

The frame 6 is provided with vertical ways 82 which may be formed in separate members suitably secured to the frame for guiding a vertically reciprocable member or main slide 83 which extends downwardly toward the base 8 of the machine and is provided at its lower end with an opening 84 into which the adjacent ends of the base plate 15, of slide 52 and of worms 17, 18 of entrance unit 2 may extend.

Figure 8:
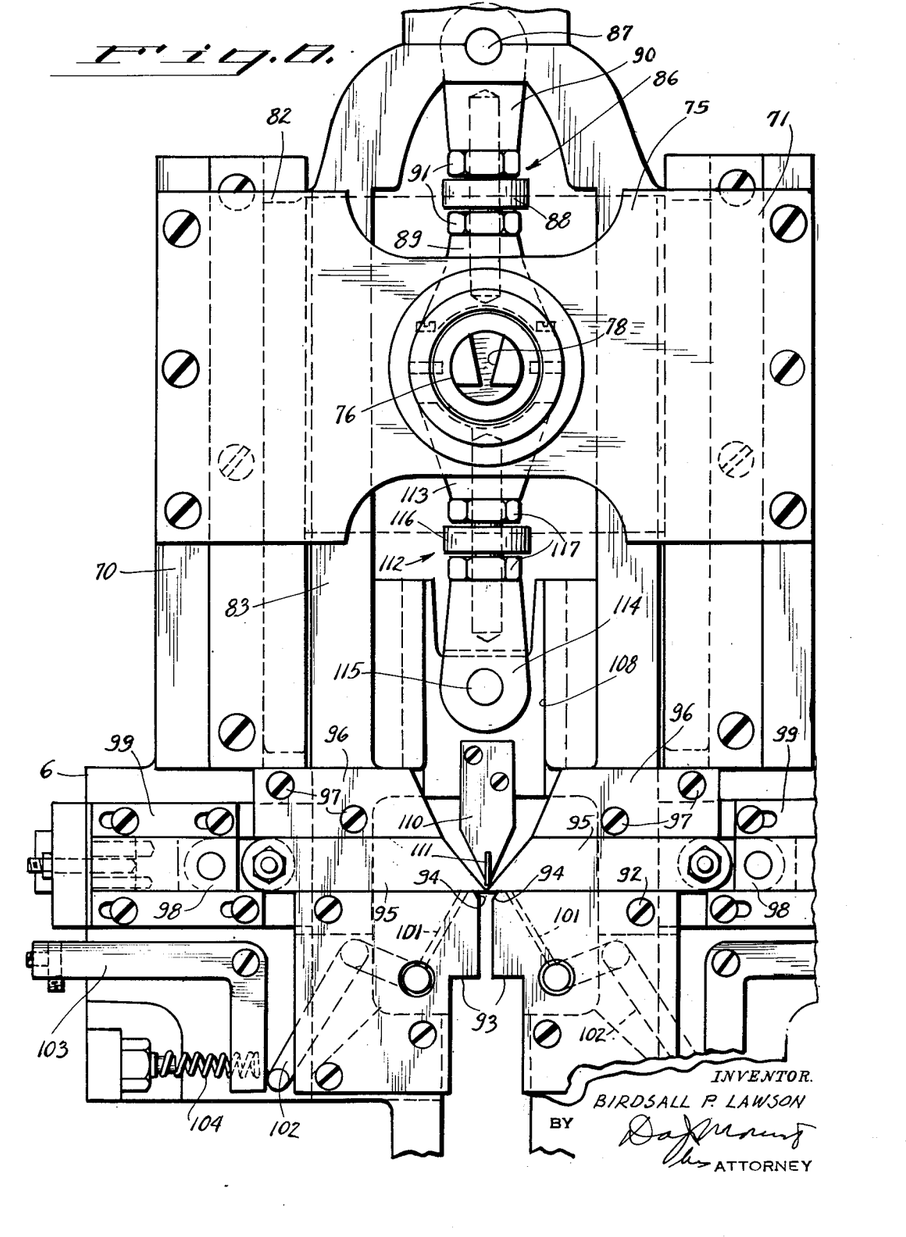
Figure 9:
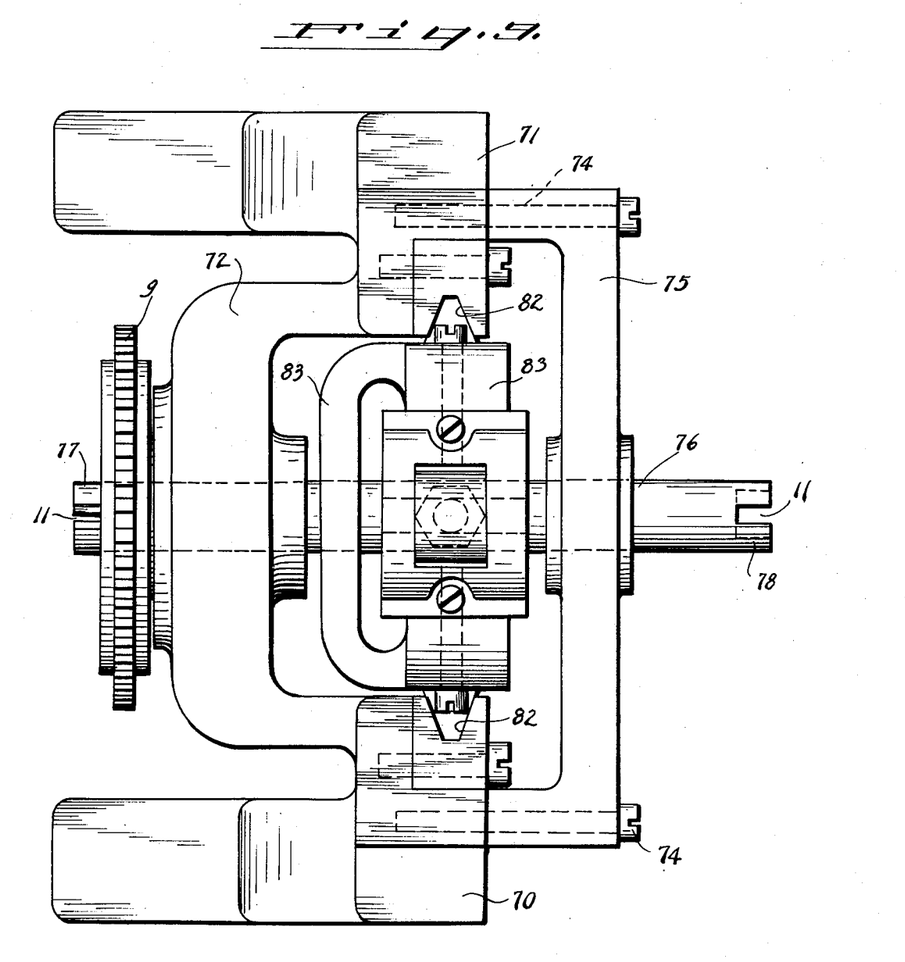
Fig. 9 is a top plan view of the necking unit illustrated in Fig. 8.
Figure 11:
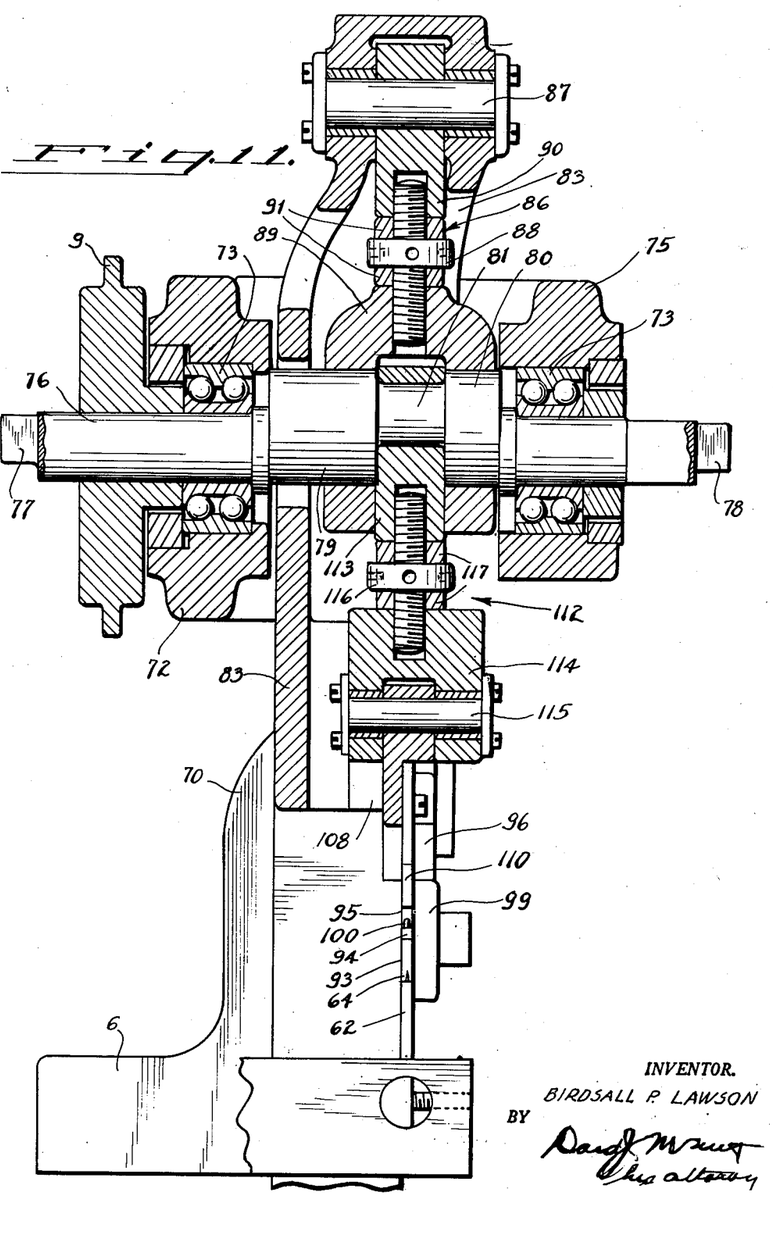
Fig. 11 is a further vertical section through the necking unit, on line 11—11 of Fig. 9, with the reciprocatory means of said unit in their lowermost position.

The main slide 83 is vertically reciprocated between an uppermost position shown in Fig. 10 and a lowermost position shown in Fig. 8 from the aforementioned crank portions 79, 80 through a pitman 86 mounted at its lower end on said portions and at its other end on a pin 87 carried by the main slide (see Figs. 10, 11). The length of the pitman is adjustable by means of the threaded member 88 interconnecting the pitman head 89, rotatably secured to the crank portions 79, 80, with the pitman head 90 on the pin 87. Lock nuts 91 maintain the desired adjustment of the pitman.

The lower end of the main slide has secured thereto, as at 92, a pair of plates 93 (hereinafter termed "nest plates" by reason of their function) which plates, in the assembled condition of the machine, are juxtaposed to the die plate 55 of unit 2 and are in alinement with the arbor 62 against which they abut with their opposed inner faces, as shown in Fig. 10, and along which they move in the reciprocation of the main slide. The opposed inner upper corners of the plates are cut away, as at 94, to define between the opposed faces of the plates a recess, above the working point 64 of the arbor, contoured to accommodate the wings of the sliders into which the sliders pass at the end of their progression through the worms 17, 18 to remain nested therein during the necking operation.

Figures 15, 16, 17:
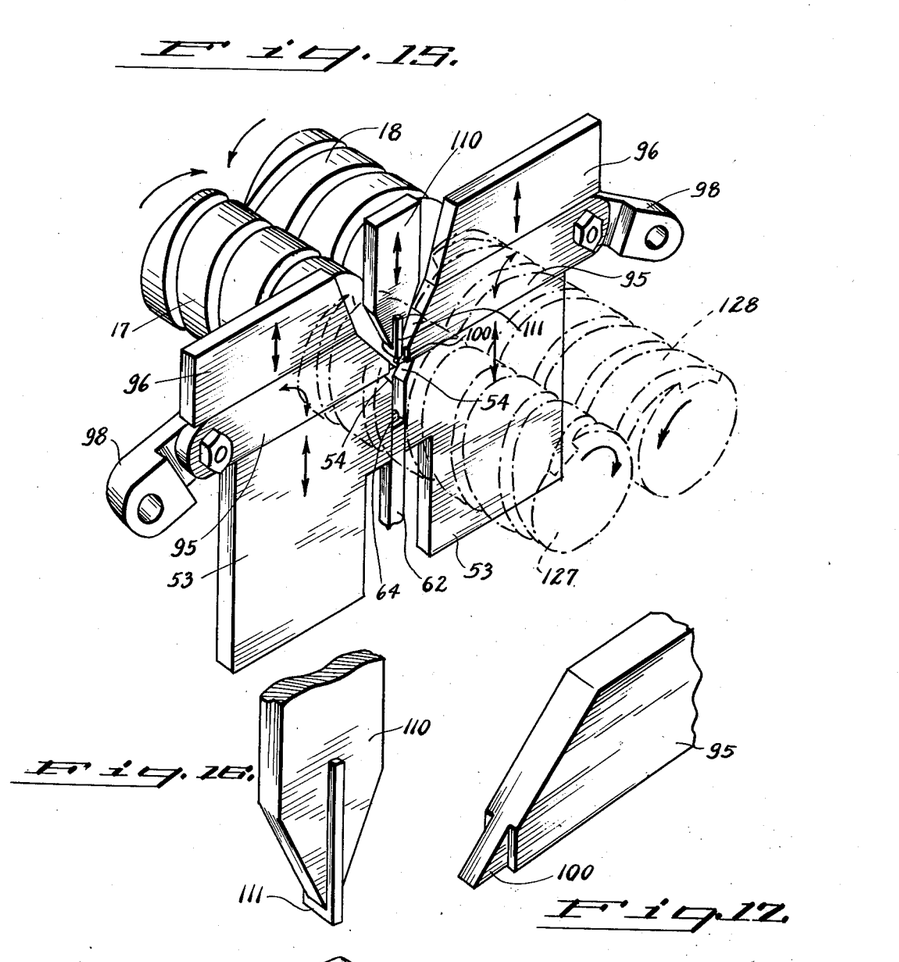
Fig. 15 is a diagrammatic perspective view of the means cooperating to produce the reinforcement in the neck of the sliders, of the worms for feeding the sliders to said cooperating means and of the worms for discharging the slider upon completion of the necking operation, the figure illustrating the relationship of such means and worms in the assembled machine.
Fig. 16 is a perspective enlarged view of the necking punch.
Fig. 17 is an enlarged perspective view of one of the slider engaging fingers forming part of the necking means.

Horizontal fingers 95 are slidably mounted in guideways defined by the top faces of the nest plates 93 and the opposed bottom faces of a pair of members or finger covers 96 fixed to the main slide, as at 97. Each finger 95 is pivotally connected at its outer end to one end of a link 98, said links being pivotally mounted on blocks 99 secured to opposite sides of the frame 6 and adjustable toward and away from one another. By virtue of this connection, the fingers 95 are caused by the links to effect a horizontal reciprocation during the vertical reciprocation of the main slide with which they move, between a retracted or inoperative position (in the uppermost position of the slide, Fig. 10) and an operative position reached at the end of the downstroke of the slide (Fig. 8) in which the free or working ends of the fingers are substantially in contact. As illustrated in Fig. 17, the free end of each finger is reduced to define a working point 100 adapted to enter the sliders between the wings thereof adjacent the neck portion 41, to cooperate in the necking operation as hereafter more fully described.

Since the integrity if the working point 100 is essential to the attainment of the neck reinforcement and to the proper operation of the machine, safety means are provided to arrest the machine should either point become chipped or broken. For this purpose, there are provided brass pins 101, one for each finger, which are mounted in suitable holes within the nest plates at one end of bell cranks 102. These latter are pivoted to the main slide and are engaged at their other ends by further bell cranks 103 biased by springs 104, which urge the bell cranks 102 to a position in which they maintain the pins in contact with the working points 100 of the retracted fingers. The bell cranks 103 are associated with microswitches 105 (one of which is shown in Fig. 10). Should one of the working points 100 become chipped or broken, the associated pin 101 will become free to advance and therefore the respective spring 104 will be allowed to rock the bell crank 103, to actuate the associated microswitch to stop the driving motor through suitable electric connection.

A secondary slide 108 is mounted for vertical reciprocation in the main slide 83 which is provided with guideways 109. The secondary slide has secured thereto a downwardly extending punch 110 having a working end 111 (best illustrated in Fig. 16) above and in vertical alinement with the arbor 62. The reciprocation of the secondary slide 108 and punch 110 relative to the main slide, between an uppermost position shown in Fig. 10 and a lowermost position shown in Fig. 8, is obtained during operation of the machine, concurrently with the reciprocation of the main slide relative to the frame, by means of an adjustable pitman 112 from the eccentric portion 81 of crankshaft 10. The pitman 112 comprises, similarly to pitman 86, an upper head 113 mounted on said crank portion 81 connected by an adjustable threaded member 116 to a lower head 114 mounted on a pin 115 carried by the secondary slide. The desired adjustment of the length of the pitman is maintained by lock units 117. As the distance between the axes of the crank portion 81 and of the crankshaft 10 is greater than the distance between the axes of the crank portions 79, 80 and of the crankshaft 10 (as shown somewhat exaggerated in Figs. 10, 11 for the purpose of illustration) and all the crank portions are in the same angular position on the shaft 10, it is evident that the length of the stroke of the secondary punch-carrying slide 108 will be greater than the length of the stroke of the main slide 83, so that the secondary slide with the necking punch 110 will be reciprocated within the main slide in synchronism with the actuation of the main slide and with the horizontal reciprocation of the necking fingers 95, which is dependent on the actuation of the main slide. The various parts are suitably proportioned to obtain the uppermost and lowermost positions of the necking punch respectively illustrated in Figs. 10 and 8, which are respectively required for permitting passage of the sliders from the worms 17, 18 into the aforementioned recess defined by the nest plates 93 at the beginning of the necking cycle, and proper action of the punch on the neck of the sliders in cooperation with the horizontally reciprocable fingers 95 and the stationary arbor 62 during the necking operation hereafter more fully described.

Figure 12:
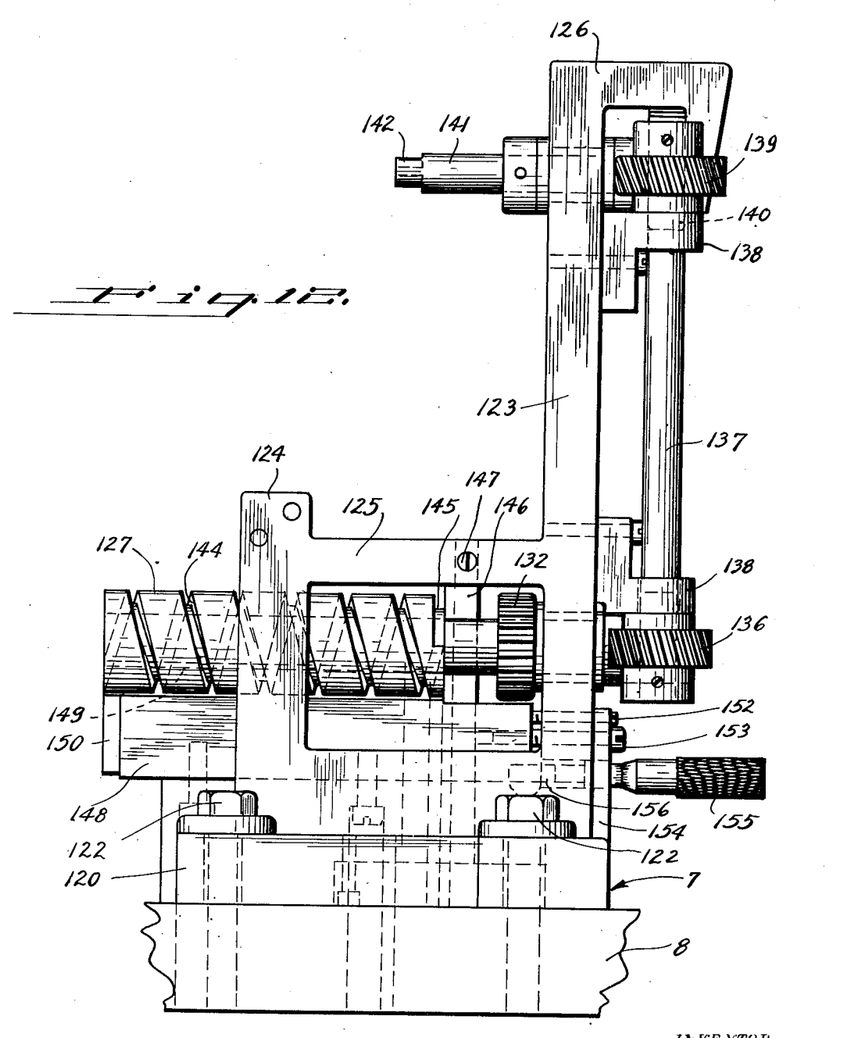
Fig. 12 is a side elevational view of the third or exit unit forming part of the machine.
Figure 13:
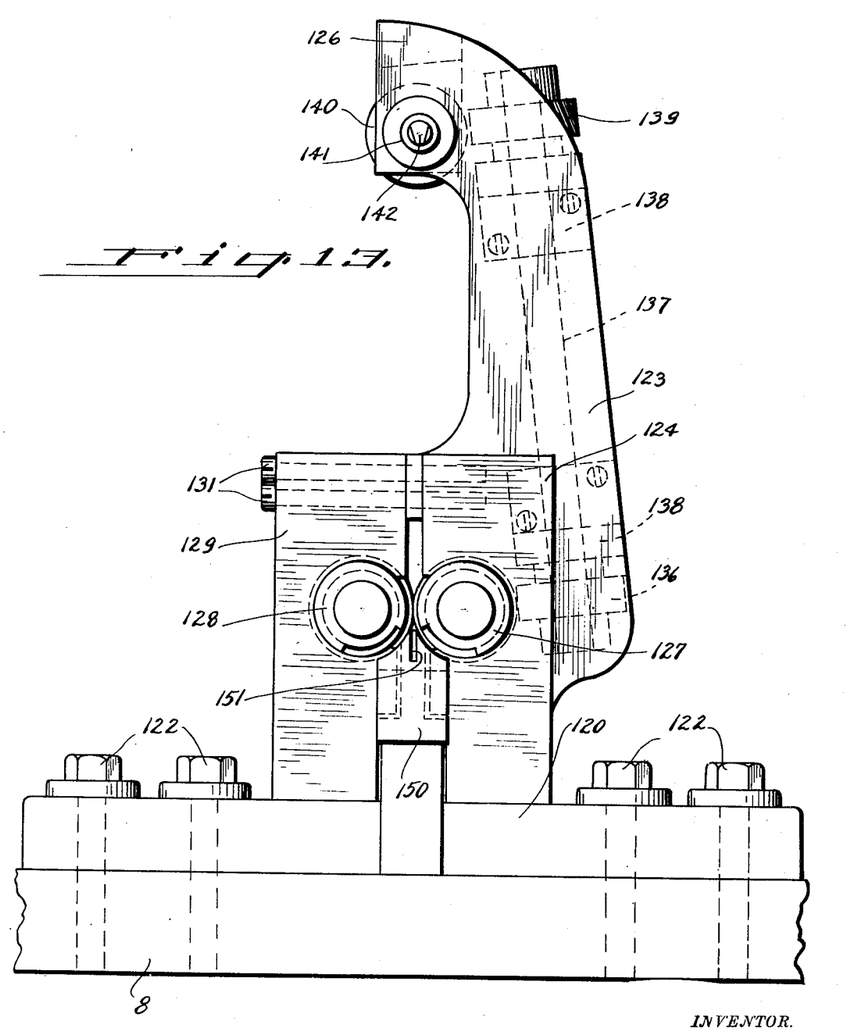
Fig. 13 is an end elevational view of the unit of Fig. 12.
Figure 14:
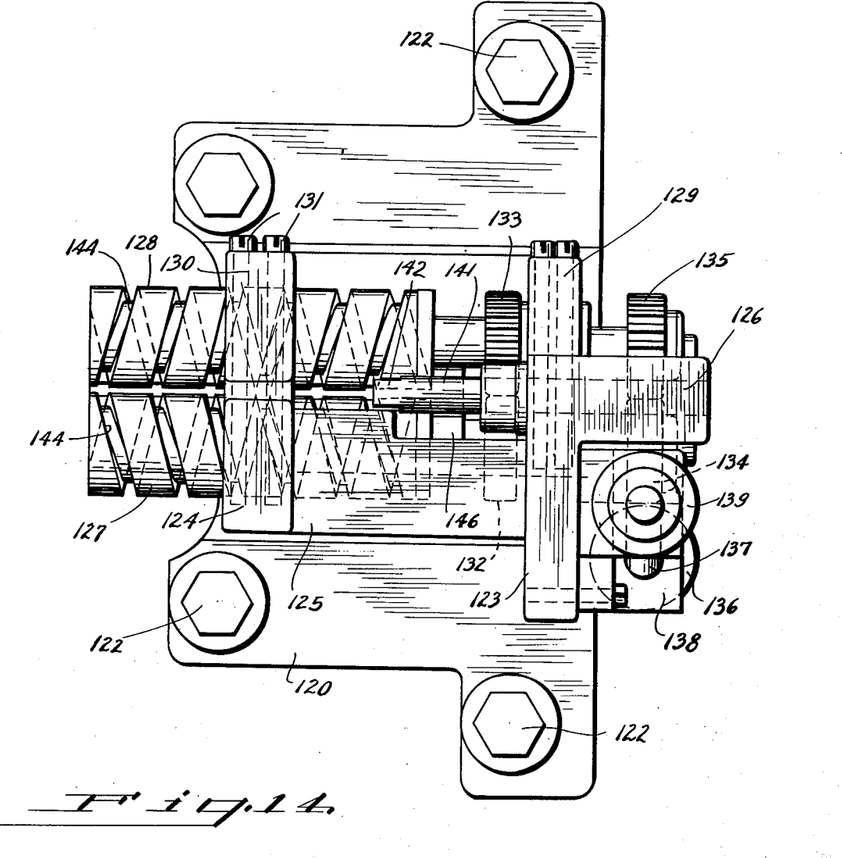
Fig. 14 is a top plan view of the same unit.

The third or exit unit 4 of the machine is illustrated in detail in Figs. 12 to 14, to which reference will now be had.

Broadly, this unit is similar in structure to the entrance unit 2. Its frame 7 likewise comprises a casting, suitably secured to a base plate 120 fastened to the base 8, as by means of bolts 122, which defines a pair of members or uprights 123, 124 interconnected by an integral horizontal element 125, the upright 123 being formed at its upper end with a bracket portion 126.

A pair of horizontal parallel grooved members or worms 127, 128 are, respectively, rotatably mounted in said uprights and in members 129, 130 mounted on the base plate 120 and fixed to the uprights as by means of screws 131; the worms carry at their outer ends intermeshing gears 132 and 133, respectively. Mounted on an extension of the worms there are further intermeshing gears 134, 135, gear 134 meshing in turn with a gear 136 fastened to the lower end of an upwardly extending shaft 137 which is journalled in bearings 138 secured to the upright 123. The upper end of the shaft 137 carries a gear 139, which is driven by a gear 140 fixed on a horizontal shaft 141 suitably mounted in the aforesaid bracket portion 126 and having a free end 142 shaped for interengagement with the adjacent end 78 of the crankshaft 10 of unit 3 in the assembled condition of the machine. As will be apparent, the worms 127, 128 are therefore rotated in opposite directions during operation of the machine simultaneously with the worms 17, 18 of the unit 2 and in fixed time relation with the actuation of the slides of the necking unit 3.

The grooves 144 of the worms 127, 128 have terminal straight portions 145 at their outer or right ends, from which the sliders, conveyed thereto by the worms upon completion of the necking operation as hereafter described, fall into the entrance opening of an adjacent unit chute 146 secured to the element 125 as at 147. A suitable shoulder may be provided at the outer end of the worms to facilitate ejection of the sliders.

A slide 148 is mounted on the base plate 120 underneath the worms longitudinally thereof, and is provided with a tapering portion 149 projecting upwardly between the worms. The upper edge of this portion defines a track along which the sliders travel in their progression toward the exit chute. Removably secured to the inner or left end of the slide (as seen in Fig. 12), there is a die plate 150 the outer face of which is flush with the inner end of the worms and which has a contour conforming to that of the slide 148 of which it forms an extension. The free face of the die plate is vertically centrally grooved, as shown at 151, to accommodate the bail attaching lugs of the sliders during the necking operation. In the assembled operating condition of the machine, said free face of the die plate 150 abuts against the arbor 62, by which it is separated from the opposed die plate 55 of the unit 2. To insure maintenance of the die plate 150 in the desired position in the assembled machine, the slide 148 is longitudinally adjustable by means of push-pull screws 152, 153 mounted in a block 154 integral with the base plate 120 at the right end of this latter, the screws being supplemented, to permit of micrometric adjustment of the slide, by a micrometer head 155 likewise mounted on block 154 and acting on a stud 156 carried by the slide.

The operation of the machine which is clearly illustrated in Figs. 15, 19A—19B and 20A—20B, is as follows:

The sliders, hoppered or otherwise suitably fed to the chute 34, are guided thereby in succession to the oppositely rotating worms 17, 18 to fall by gravity along the initial straight portions of the worm grooves 45, as soon as these latter reach the required position in the rotation of the worms, onto the initial portion of the track defined by the upper edges of the described block 54 and upper portion 53 of the slide 52 of the unit 2. As aforesaid, the chute directs the sliders to the worms in a vertical position with the bail attaching lug 42 uppermost and forwardly projecting, and the worms are of course so arranged to engage with their grooves the opposite sides of the slider wings 39, 40 to propel the sliders therealong in their continued rotation to the right or inner ends of the worms.

At the end of its progression along the worms, each slider 38 is caused to enter into the aforementioned recess defined by the cut away portion 54 of the nest plates 53 from which it is supported in a position above the arbor 62. At this point, the main slide 83 of the necking unit 3 and therefore the nest plates are in their uppermost position; the secondary slide 108 is likewise in its uppermost position and therefore the punch 110 carried thereby is withdrawn to permit passage of the slider. Actually the length of the stroke of the secondary slide is only slightly greater than that of the stroke of the main slide, and therefore the working end of the punch will be close to the neck of the slider received between the nest plates. The respective position of the various elements is illustrated at A in Fig. 20A. While entering the recess defined by the nest plates 53, the slider will also engage with its lug 42 the preceding slider (which at that time has already been subjected to the necking operation but will still be supported by the nest plates with which it remains associated throughout the necking operation) and expel the same from the nest plates, whereupon the preceding slider will be engaged by the initial portion of the grooves 127, 128 of the unit 4 and progressively conveyed thereby to the discharge chute 146. This action of the slider is illustrated at B in Fig. 20A.

The main slide is then gradually actuated from the crankshaft 10 and begins its downward movement to its lowermost position thereby gradually lowering the nest plates and permitting downward movement of the slider together with the plates during which movement of the slider the working point 64 of the stationary arbor 62 gradually enters between the wings of the slider. In fact, the slider is forced downwardly together with the nest plates by the working end of the punch which, soon after the beginning of the movement of the main slide, is actuated by the secondary slide into engagement with the neck of the slider, and then gradually advances to its final position to deform the neck. The phases of the movement of the nest plates and of the slider to the respective final positions are illustrated at C—D, E—F and G—H in Figs. 20A and 20B. During its downward displacement, the slider, the thickness of which substantially corresponds to that of the nest plates and of body of the arbor, slides between the confining opposed die plates 55 and 150 of the units 2 and 4 which abut against the arbor, and its lug 42 slides within the groove 151 of the die plate 150. Should the wings of the slider be slightly diverging, they will be forced to the required final parallel position by the die plates during the conjoint downward movement of the nest plates and slider effected as aforesaid.

Figure 20A:
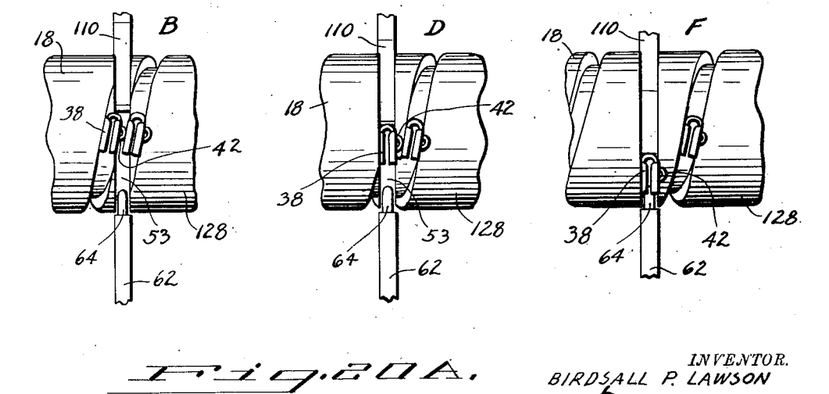
Figs. 20A and 20B are fragmentary elevational views of the necking means and worms in various phases of the necking cycle identified in the diagram of Figs. 19A—19B, illustrating the action of said necking means and worms.
Figure 20B:
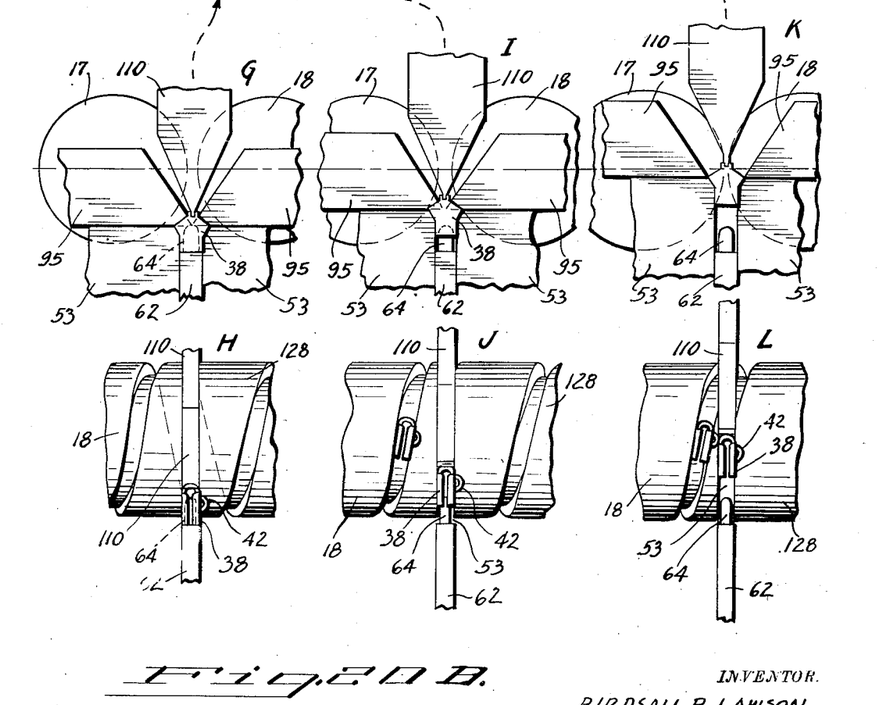

Concurrently with the movement of the main slide, the fingers 95, the movement whereof depends on that of the slide as previously described, are also oppositely gradually actuated to their operative position in which their reduced working points 100 extend into the wings of the slider adjacent the neck portion 41 thereof as illustrated at G in Fig. 20B. In this position, said working points while operating with the nest plates, the arbor and the die plates firmly to hold the slider against displacement, provide anvil surfaces within the slider controlling the deformation of the slider neck by the punch 110.

During the descent of the main slide 83, the secondary slide 108 carrying the necking punch 110 is also actuated from the crankshaft 10 to effect its downward stroke. Since by virtue of the actuating structure hereinbefore described, the punch 110 is also displaced, during its downward stroke, relative to the nest plates and the slider supported thereby, to its lowermost position shown at G and H in Fig. 20B, to deform with its working point 111 the neck 41 of the slider and define the substantially V-shaped reinforcement 160 (best shown in Fig. 3) by displacing the material of the neck into contact with the underlying inclined surfaces of the working points 100 of the fingers 95 functioning as an anvil. As, however, the length of the stroke of the punch is only slightly greater than that of the nest plates and the punch moves into contact with the slider shortly after the beginning of the respective strokes, it is apparent that the action of the punch is a gradual one extended over a considerable period of time in relation to the total time required for the completion of the necking cycle; the flow of metal is therefore accurately controlled and the deformation of the neck of the slider obtained without undue heating of the metal so that the operation of the machine may be greatly speeded up without affecting the desired results.

Upon completion of the necking operation, the main and secondary slides initiate their return stroke so that the nest plates carrying the necked slider are gradually returned to their uppermost position of the cycle and the necking punch is withdrawn from the slider, passing through the phases illustrated at I—J and K—L in Fig. 20B. The strokes and the relative positions of the nest plates and slider and of the necking punch throughout the necking cycle are shown (exaggerated for the purpose of illustration) respectively by the curves S and $S^1$ in the diagram of Figs. 19A—19B.

Toward the end of the return stroke of the nest plates, the necked slider is engaged by the lug of the following untreated slider, as aforementioned, which at that time is reaching the end of the worms 17, 18. The necked slider is therefore gradually expelled from the nest plates to be engaged by the initial portions of the grooves 144 of the worms 127, 128 of the exit unit 4, which at that time reach a position for engaging the slider, and is propelled along said worms to the exit chute travelling on the track defined by the upper edge of the portion 149 of the slide 148. In the meantime the following untreated slider is entered between the nest plates, and the necking cycle described is repeated.

While I have described the invention substantially with reference to a preferred embodiment thereof illustrated by way of example in the drawings, it is to be understood that changes and modifications may be made in the structures described, and that, for instance, the elements cooperating to produce the neck reinforcement may be modified to obtain a reinforcement of appropriate shape other than specifically illustrated in the figures, without departing from the spirit of the invention or exceeding the scope of the claims.

I claim:

1. A machine for producing a reinforcing deformation in the neck of sliders for slide fasteners, comprising a slider feeding unit, a slider discharging unit, each of said units embodying a pair of continuously oppositely rotating grooved slider conveying worms, tracks between each pair of conveying worms for guiding sliders transported thereby along a horizontal plane, each of said conveying worms having spaced spiral grooves, and a slider neck deforming unit disposed between and in juxtaposition with the adjacent ends of said slider feeding and discharging units, the respective units terminating and beginning next to the deforming unit, said slider neck deforming unit embodying vertically reciprocable means for receiving the sliders in succession from said oppositely rotating worms of the slider feeding unit and being movable with the received slider between the slider receiving position and a further predetermined position, a vertically reciprocable punch movable in one direction for deforming the neck of the slider carried by the slider receiving means to said further position thereof, and reciprocable means operably connected with said slider receiving means and actuable thereby to move from opposing directions transversely of said punch for entering into association with said received slider for controlling the deformation of the neck of the sliders by the punch, each neck deformed slider, upon return of said vertically reciprocable slider receiving means to its slider receiving position, being displaced from said slider receiving means onto the track of and into engagement with the grooves at the adjacent end of the oppositely rotating worms of said slider discharging unit by the following slider conveyed to the vertically reciprocable slider receiving means by the worms of the feeding unit and driving mechanisms operatively connected respectively with said means for actuating the same in fixed time relation.

2. A machine for producing a reinforcing deformation in the neck of sliders for slide fasteners comprising rotary slider propelling means, a main slide adjacent said rotary slider propelling means and carrying nest plates for the sliders, said main slide being vertically reciprocable between an uppermost position in which said nest plates receives the sliders from the slider propelling means and a lowermost position, a vertically reciprocable secondary slide movable within the main slide relative to this latter in the same direction, said secondary slide carrying a punch actuable thereby to deform the neck of the sliders in the movement of the main slide to its lowermost position, horizontally reciprocable fingers operably connected with and actuable by the main slide in the movement of the main slide from its uppermost position to an operative position, said fingers during said movement of the main slide being extended from opposing directions into the sliders to control the deformation of the neck of the sliders by the punch, and rotary slider discharging means adjacent the main slide for receiving the sliders from the nest plates upon return of the main slide to its uppermost position, each said slider propelling means and slider discharging means comprising conveying worms having spiral grooves, and the grooves in said propelling and discharging means being juxtaposed to the entrance and exit of the vertically reciprocable deforming means, and driving mechanisms operatively connected respectively with said means for actuating the same in fixed time relation.

3. A machine for producing a reinforcing deformation in the neck of sliders for slide fasteners, comprising rotary slider propelling means, a main slide adjacent said rotary slider propelling means and carrying nest plates for the sliders, said main slide being vertically reciprocable between an uppermost position in which said nest plates receive the sliders from the slider propelling means and a lowermost position, a vertically reciprocable secondary slide movable within the main slide relative to this latter in the same directions, said secondary slide carrying a punch actuable thereby to deform the neck of the sliders in the movement of the main slide to its lowermost position, horizontally reciprocable fingers operably connected with and actuable by the main slide in the movement of the main slide from its uppermost position to an operative position, said fingers having portions conformed to extend into the sliders during the movement of the main slide from the uppermost position to said operative position to control the deformation of the neck of the sliders by the punch, and rotary slider discharging means adjacent the main slide for receiving the sliders from the nest plates upon return of the main slide to its uppermost position, each said slider propelling means and slider discharging means comprising conveying worms having spiral grooves, and the grooves in said propelling and discharging means being juxtaposed to the entrance and exit of the vertically reciprocable deforming means, each slider being fed to the rotary slider discharging means by the following slider propelled to the nest plates by the rotary slider propelling means aforesaid and driving mechanisms operatively connected respectively with said means for actuating the same in fixed time relation.

4. A machine for producing a reinforcing deformation in the neck of sliders for slide fasteners, comprising rotary slider propelling means, means for feeding slider in succession to said propelling means, nest members mounted adjacent the delivery end of said slider propelling means and vertically reciprocable between an uppermost position in which they receive the sliders from said propelling means and a lowermost position, a vertically reciprocable punch movable relative to and between said nest members for engaging and deforming the neck of the sliders in the movement of the nest members to their lowermost position, horizontally reciprocable fingers operably connected with and actuable by the movement of the nest members to their lowermost position into association with the sliders to provide surfaces controlling the deformation of the neck of the sliders by said punch, an adjustable stationary member between the nest members adapted to enter the sliders in the movement of the nest members, adjustable stationary plates on opposite sides of the nest members and of said stationary member cooperating with this latter to hold the sliders against displacement under the action of the punch, and rotary means for discharging the sliders, each said slider propelling means and slider discharging means comprising conveying worms having spiral grooves, and the grooves in said propelling and discharging means being juxtaposed to the entrance and exit of the vertically reciprocable deforming means, said rotary means receiving each slider from the nest members upon return of these latter to their uppermost position after deformation of the sliders under the displacing action of the following slider propelled to the nest members by the rotary slider propelling means aforesaid and driving mechanisms operatively connected respectively with said means for actuating the same in fixed time relation.

BIRDSALL P. LAWSON.

REFERENCES CITED

The following references are of record in the file of this patent:

UNITED STATES PATENTS

| Number | Name | Date |
|---|---|---|
| 1,801,325 | Blair | Apr. 21, 1931 |
| 1,890,300 | Nagele | Dec. 6, 1932 |
| 2,229,998 | Corner | Jan. 28, 1941 |
| 2,300,302 | Morin | Oct. 27, 1942 |
| 2,364,100 | Savitsky | Dec. 5, 1944 |
| 2,366,269 | Lawson | Jan. 2, 1945 |
| 2,384,144 | Voity | Sept. 4, 1945 |
| 2,409,966 | Voity et al. | Oct. 22, 1946 |